United States Patent Office 3,226,303
Patented Dec. 28, 1965

3,226,303
5α-HYDROXYLATION OF A-NOR-5α-STEROIDS
Allen I. Laskin, Somerset, Samuel C. Pan, Metuchen, and Frank L. Weisenborn, Somerset, N.J., assignors to Olin Mathieson Chemical Corporation, New York, N.Y., a corporation of Virginia
No Drawing. Original application Jan. 31, 1963, Ser. No. 255,180. Divided and this application Mar. 31, 1965, Ser. No. 449,673
5 Claims. (Cl. 195—51)

This application is a division of our application, Serial No. 255,180, filed January 31, 1963.

This invention relates to, and has for its objects the provision of a microbial method for producing 5α-hydroxy steroids of the A-nor series, saturated in the A and B rings; new intermediates prepared thereby; and processes for converting said intermediates to 3,5-dehydro steroid derivatives.

It has been found that steroids of the A-nor series, that are saturated in both the A and B rings and contain a 5α-hydrogen substituent can be converted to 5α-hydroxyl derivatives by subjecting them to the action of enzymes of *Cokeromyces recurvatus* or to the action of the organism itself, under oxidizing and preferably aerobic conditions.

Among the steroids which may be hydroxylated by the practice of this invention are those steroids which are members of the A-nor-5α-androstane series and, preferably, the A-nor-5α-pregnane series. Particularly preferred are steroids of the 2-keto-A-nor-5α-pregnane series (i.e. 2-keto-A-norallopregnane series), such as A-nor-5α-pregnane-2,20 - dione, A-nor-5α - pregnane-2-one-20β-ol and 20β-acetoxy-A-nor-5α-pregnane-2-one.

The nature of the product will depend on the steroid substrate chosen. In all cases a 5α-hydroxy steroid is formed. If, however, A-nor-5α-pregnane-2-one-20β-ol is selected as the steroid, in addition to the 5α-hydroxylation, the 17-side chain is removed and A-nor-5α-androstane-5α,17β-diol-2-one is obtained as the major product.

The 5α-hydroxy steroids can then be dehydrated, according to another process of this invention to yield the known 3,5-dehydro steroid derivatives.

The action of the enzymes of *Cokeromyces recurvatus* to produce the 5α-hydroxy steroids can be utilized either by including the steroid in an aerobic culture of the microorganism, or by bringing together, in an aqueous medium, the steroid, air and enzymes of non-proliferating cells of the microorganism.

In general, the conditions of culturing the Cokeromyces for the purposes of this invention are (except for the inclusion of the steroid to be converted) the same as those of culturing various aerobic microorganisms for the production of antibiotics, i.e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate and/or the steroid itself. Preferably, however, the medium includes an assimilable source of carbon and energy in addition to the steroid.

The nitrogen source materials may be organic (e.g., soybean meal, cornsteep liquor, yeast extract, meat extract and/or distillers solubles) or synthetic (i.e., composed of simple, synthesizable organic or inorganic compounds such as ammonium salts, alkali nitrates, amino acids or urea).

As to the source material, lipids, especially (1) fatty acids having at least 14 carbon atoms, (2) fats or (3) mixtures thereof, may be used. Examples of such fats are lard oil, soybean oil, linseed oil, cottonseed oil, peanut oil, fancy mutton tallow, sperm oil, olive oil, tristearin, tripalmitin, triolein and trilaurein, and illustrative fatty acids include stearic, palmitic, oleic, linoleic and myristic acids.

Other carbon-containing materials may also be used. For example, such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The steroid products formed are then separated from the culture chromatographically as more fully detailed in the following examples.

The isolated 5α-hydroxy steroids can then be converted to their respective 3,5-dehydro derivatives by dehydration, preferably by employing a basic substance, such as potassium t-butoxide, potassium hydroxide, sodium methoxide, and the like. These 3,5-dehydro steroids are known substances.

The following examples are illustrative of the invention (all temperatures being in degrees centigrade):

EXAMPLE 1

5α-hydroxy-A-nor-5α-pregnane-2,20-dione (A) FERMENTATION

A stock culture of *Cokeromyces recurvatus* (Centralbureau voor Schimmel-cultures, Baarn, Holland) is maintained on a Gould agar slant, the slant containing as a nutrient medium (A):

|  | G. |
|---|---|
| Yeast extract | 2.5 |
| $K_2HPO_4$ | 1 |
| Glucose | 10 |
| Agar | 20 |

Water to make 1 liter. (Sterilized at 121° for 30 minutes.)

The surface growth on such slant, which has been incubated at 25° for two weeks is suspended in 0.01% Duponol solution. This suspension is used to inoculate two 250 ml. Erlenmeyer flasks, each containing 50 ml. of the following medium (B):

|  | G. |
|---|---|
| Malt cereal extract | 10 |
| Wilson's peptone No. 159 | 20 |
| Starch | 20 |
| Cerelose | 44 |
| $NaNO_3$ | 3 |
| $KH_2PO_4$ | 1 |
| KCl | 0.5 |
| $MgSO_4 \cdot 7H_2O$ | 0.5 |
| $FeSO_4 \cdot 7H_2O$ | 0.02 |

Tap water to make 1 liter. (Sterilized at 121° for 30 minutes; pH adjusted to 7.0.)

After incubating at 25° on a rotary shaker set at 280 r.p.m. and a 2″ stroke for 96 hours, 40 ml. of the fully grown culture is used to inoculate each 4 liter Erlenmeyer flask, containing 400 ml. of the same medium (B). To each flask is added 2.0 ml. of a 6% (w./v.) solution of A-nor-5α-pregnane-2,20 - dione in dimethyl formamide, which has been sterilized by filtration through sintered glass thereby giving a final concentration of 300 μg. of steroid per ml. of medium. These flasks are then incubated for seven days under the same conditions used to incubate the 250 ml. Erlenmeyer flasks.

(B) ISOLATION OF 5α-HYDROXY-A-NOR-5α-PREGNANE-2,20-DIONE

The contents of the flasks obtained in step (A) are pooled and extracted twice with 1/10 its volume of chloroform. The chloroform extract is washed twice with 1/5 its volume of water, dried over anhydrous sodium sulfate and evaporated to dryness. The dried residue is taken up in a small volume of 1:1 methanol-chloroform and chromatographed on thin layer plates. Silica Gel-G (E. Merck, Germany) with plaster of Paris as binder spread to a thickness of 0.5 mm. is used as the adsorbent and a mixture of 1 vol. of chloroform and 2 vol. of ethyl acetate is used as the developing solvent. An amount of the extract representing 20 mg. of the steroid substrate is applied per inch of the plate width. The solvent front migrates 15–20 cm. in 90 minutes. After the solvent evaporates off, the plate is exposed to iodine vapor for one hour. The steroids appear as brown bands. These bands are marked out with a stylus. After evaporating off the iodine by leaving the plate exposed in a well ventilated hood overnight, these bands are eluted with a 1:1 methanol-chloroform mixture. The methanol-chloroform eluate of the band at $Rf=0.65$ is evaporated to dryness. The residue is partitioned between equal volumes of chloroform and 50% (v./v.) methanol in water. The chloroform phase is washed twice with water and dried over anhydrous sodium sulfate. Evaporation of the chloroform yields crude crystals of 5α-hydroxy-A-nor-5α-pregnane-2,20-dione, which are recrystallized from acetone-n-hexane to yield the pure product, M.P. about 242–244°. $[\alpha]_D+238°$ (chloroform).

EXAMPLE 2

5α,17β-Dihydroxy-A-nor-5α-androstane-2-one

(A) FERMENTATION

Following the procedure of Example 1, step (A), a 20% (v./v.) transfer is made from the fully grown culture in the first stage 250 ml. Erlenmeyer flasks to 250 ml. Erlenmeyer flasks, each containing 50 ml. of the same medium (B). After incubating for 48 hours under the same conditions used in the first stage, 100 ml. of the culture obtained in the second stage is added to 900 ml. of sterilized distilled water in a 4 liter Erlenmeyer flask. To the flask is then added 2.0 ml. of a 6% (w./v.) solution of 20β-hydroxy-A-nor-5α-pregnane-2-one in dimethyl formamide which has been sterilized by filtration through sintered glass, thereby giving a final concentration of 200 μg. of steroid per ml. of medium. The flask is then incubated for seven days at 30° on a reciprocating shaker set at 110 cycles per minute and a 1″ stroke.

(B) ISOLATION OF 5α,17β-DIHYDROXY-A-NOR-5α-ANDROSTANE-2-ONE

The contents of the flask obtained in step (A) is extracted twice with 1/10 its volume of chloroform and the chloroform extract is then treated as described in step (B) of Example 1. The methanol-chloroform eluate of the band at $Rf=0.45$ is evaporated to dryness. The residue is partitioned between equal volumes of chloroform and 50% (v./v.) methanol in water. The chloroform phase is washed twice with water and dried over anhydrous sodium sulfate. Evaporation of the chloroform yields crude crystals of 5α,17β-dihydroxy-A-nor-α-androstane-2-one, which are recrystallized from acetone-n-hexane to yield the pure product, M.P. about 251–253°; $[\alpha]_D+115°$ (acetic acid).

In a similar manner, A-nor-5α-androstane-2,20-dione is converted to 5α-hydroxy-A-nor-5α-androstane-2,20-dione. 20β-acetoxy-A-nor-5α-pregnane-2-one is converted to 5α,11-dihydroxy-20β-acetoxy-A-nor-5α-pregnane-2-one and 5α,15-dihydroxy-20β-acetoxy-A-nor-5α-pregnane-2-one. In the fermentation of A-nor-5α-pregnane-2,20-dione, some 5α,17α,20β-trihydroxy-A-nor-5α-pregnane-2-one is also formed.

EXAMPLE 3

A-nor-progesterone 25 mg. of 5α-hydroxy-A-nor-5α-pregnane-2,20-dione is dissolved in 10 ml. of t-butyl alcohol containing 100 mg. of potassium t-butoxide. After two minutes the solution is neutralized with acetic acid, evaporated to dryness and the residue distributed between chloroform and 5% sodium bicarbonate solution. The chloroform layer is washed with water, dried over sodium sulfate and concentrated to dryness. The product is recrystallized from acetone-hexane to give about 12 mg. of pure A-nor-progesterone, M.P. 152–154°.

EXAMPLE 4

A-nor-testosterone 20 mg. of 5α,17β-dihydroxy-A-nor-5α-androstane-2-one is dissolved in 8 ml. of t-butyl alcohol containing 80 mg. of potassium t-butoxide. After three minutes the solution is neutralized with acetic acid, evaporated to dryness, and the residue distributed between chloroform and 5% sodium bicarbonate solution. The chloroform layer is washed with water, dried over sodium sulfate, and concentrated to dryness. The product is recrystallized from acetone-hexane to give about 14 mg. of A-nor-testosterone, M.P. 169–172°.

Similarly, 5α-hydroxy-A-nor-5α-androstane-2,20-dione, 5α,11α-dihydroxy-20β-acetoxy-A-nor-5α-pregnane-2-one, and 5α,15α-dihydroxy-20β-acetoxy-A-nor-5α-pregnane-2-one are converted to A-norandrost-3-one-2,20-dione, 11α-hydroxy-20β-acetoxy-A-norpregn-3-en-2-one, and 15α-hydroxy-20β-acetoxy-A-norpregn-3-en-2-one respectively.

This invention may be variously otherwise embodied within the scope of the appended claims.

What is claimed is:

1. A method of converting a compound selected from the group consisting of a steroid of the A-nor-5α-androstane series and the A-nor-5α-pregnane series, saturated in both the A and B rings and containing a 5α-hydrogen substituent to a 5α-hydroxyl derivative, which comprises subjecting said steroid to the action of enzymes of *Cokeromyces recurvatus*, under oxidizing conditions, and recovering the 5α-hydroxy steroid formed.

2. The method of claim 1 wherein the steroid is of the A-nor-5α-pregnane series.

3. The method of claim 1 wherein the steroid is of the 2-keto-A-nor-5α-pregnane series.

4. A method for preparing 5α-hydroxy-A-nor-5α-pregnane-2,20-diode, which comprises subjecting A-nor-5α-pregnane-2,20-dione to the action of enzymes of *Cokeromyces recurvatus*, under oxidizing conditions and recovering the 5α-hydroxy steroid formed.

5. A method for preparing 5α,17β-dihydroxy-A-nor-5α-androstane-2-one, which comprises subjecting 20β-hydroxy-A-nor-5α-pregnane-2-one to the action of enzymes of *Cokeromyces recurvatus*, under oxidizing conditions and recovering the 5α-hydroxy steroid formed.

References Cited by the Examiner

UNITED STATES PATENTS 3,143,480    8/1964    Laskin _____ 195—51

A. LOUIS MONACELL, *Primary Examiner.*

ALVIN E. TANENHOLTZ, *Examiner.*